Oct. 20, 1936.  W. S. BRUBAKER ET AL  2,058,056
COUNTER SETTING MEANS
Filed Sept. 8, 1934
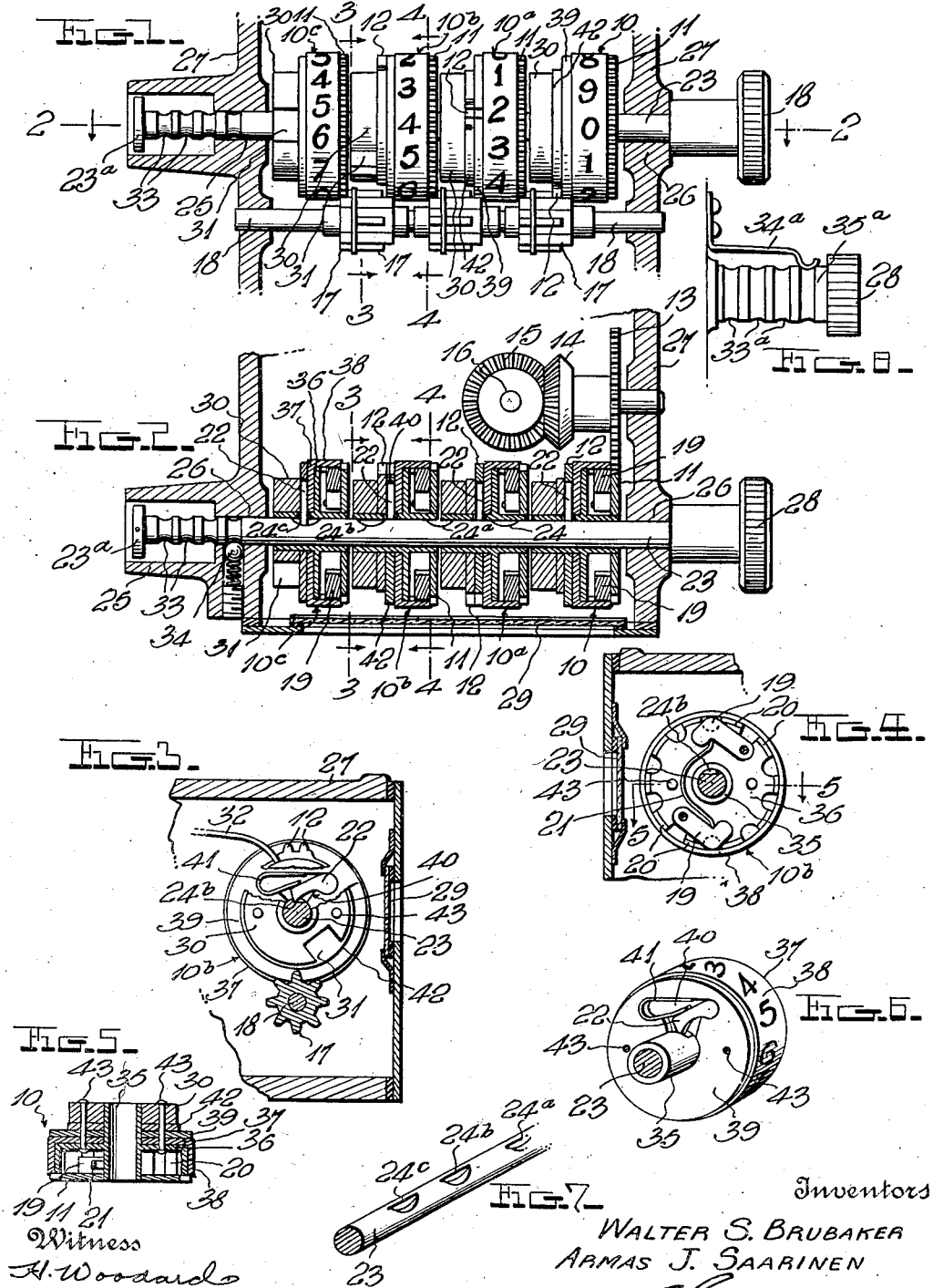
Inventors
WALTER S. BRUBAKER
ARMAS J. SAARINEN Patented Oct. 20, 1936

2,058,056

UNITED STATES PATENT OFFICE 2,058,056

COUNTER-SETTING MEANS

Walter S. Brubaker and Armas J. Saarinen, San Francisco, Calif., assignors to Granberg Meter Corporation, San Francisco, Calif., a corporation of California Application September 8, 1934, Serial No. 743,285

5 Claims. (Cl. 235—117)

The invention relates to mechanisms including a counter having numeral wheels which are retrogradely driven from positions at which they jointly indicate a number, to zero positions, for a predetermined purpose. One example of such a mechanism is an assemblage of liquid meter, liquid shut-off valve, and counter, in which assemblage the counter is set by hand to show the number of gallons which it is desired to dispense and is retrogradely driven by the meter during the dispensing operation, said counter serving to effect closing of said shut-off valve when all of the numeral wheels have been retrogradely driven to their zero positions.

It is the object of the invention to provide novel and advantageous means for setting the numeral wheels to indicate any desired number, preparing them for retrograde driving back to zero, whether these wheels actually perform the work of stopping a mechanism, giving an alarm, etc. when they arrive at zero, or merely indicate to an attendant that he is then required to perform a given duty, for instance, stop the mechanism.

With the foregoing in view, the invention resides in the novel subject matter hereinafter described and claimed, description being accomplished by reference to the accompanying drawing.

Fig. 1 is an elevation partly in section showing a counter including the novel resetting means.

Fig. 2 is a longitudinal sectional view on line 2—2 of Fig. 1.

Figs. 3 and 4 are transverse sectional views on lines 3—3 and 4—4 respectively of Figs. 1 and 2, parts being broken away and the setting shaft shifted in Fig. 3 to more clearly show the co-action of one of the setting pawls and shoulders.

Fig. 5 is a detail sectional view through one of the numeral wheels on line 5—5 of Fig. 4.

Fig. 6 is a perspective view of parts of one of the numeral wheels showing more particularly the setting pawl thereof.

Fig. 7 is a sectional perspective of a portion of the setting shaft.

Fig. 8 is a detail side elevation showing a different means for holding the setting shaft in any of its operative positions.

A four-wheel counter is shown having a tenths wheel 10, a unit wheel 10a, a tens wheel 10b, and a hundreds wheel 10c but obviously any desired number of wheels could be provided. The tenths wheel 10 is driven and all of the wheels are geared together in the customary way so that one revolution of wheel 10 will turn wheel 10a one step, ten steps or one complete revolution of wheel 10a will turn wheel 10b one step, and ten steps or one complete revolution of wheel 10b will turn wheel 10c one step. In the present showing, one side of each numeral wheel is provided with a gear 11 so connected with the wheel that the latter may be turned with respect to the former to allow setting of the wheel. The other side of each numeral wheel (except wheel 10c) is provided with a two-tooth gear 12. The gear 11 of wheel 10 meshes with a drive gear 13 which may be driven by other gearing 14, 15 from a meter-driven shaft 16 or may be driven in any other suitable way. The gears 11 of the wheels 10a, 10b and 10c all mesh with the usual transfer pinions 17 and these pinions are co-operable also with the two-tooth gears 12 of the wheels 10, 10a and 10b. The pinions 17 are all mounted rotatably on a stationary shaft 18 and after transferring motion from one wheel to the next serve in the usual way to lock the gear 11 of the latter against rotation under other influence. All other parts of any wheel however, may be turned bodily with respect to the gear 11 thereof, for setting the counter before driving the same, due to the connection provided between each wheel and its gear 11. This connection in the present showing consists of two pawls 19 held in engagement with ratchet teeth 20 by means of a spring 21.

Each of the numeral wheels is provided with a setting pawl 22 and all of said wheels are mounted upon a setting shaft 23, the latter being provided with setting shoulders 24, 24a, 24b and 24c for co-action with the pawls 22 of the wheels 10, 10a, 10b and 10c respectively. The setting shaft 23 is normally stationary but is rotatably and slidably mounted in bearings 25 and 26 of the casing 27, and said shaft is provided with a knob 28 by means of which it may be slid longitudinally to various positions and then rotated to individually set the numeral wheels. The shaft 23 may well normally occupy one of these positions as seen in Fig. 2, the setting shoulder 24c being then in position to engage the setting pawl 22 of the wheel 10c, when said shaft 23 is rotated in the proper direction, allowing said wheel 10c to be so set that any desired numeral thereof may appear in the view opening 29 of the casing 27. The various setting shoulders are so spaced that only one of said shoulders can co-operate with its respective setting pawl in one position of the setting shaft 23 as will be clear from Fig. 2. In this view, the shoulder 24b is spaced from the pawl 22 of wheel 24b, the shoulder 24a is spaced twice as far from the pawl 22 of wheel 10a and the shoulder 24 is spaced three times as far from the pawl 22 of wheel 10. The shaft 23 may obviously be slid into such position that shoulder 24b will coact with pawl 22 of wheel 10b, that shoulder 24a will cooperate with pawl 22 of wheel 10a or that shoulder 24 will co-act with pawl 22 of wheel 10, and thus the various wheels may be individually set to show any desired number in the view opening 29, preparing the counter for operation. During this operation, the wheels are retrogradely driven until finally they all arrive at zero, at which time they perform the desired duty.

In the present showing, each numeral wheel carries a disk 30 having a peripheral notch 31. Mechanism-controlling fingers, such as 32 of Fig. 3, which fingers are rigidly connected with each other, ride on the peripheral edges of the disks 30 until all of the notches 31 have been aligned by driving the numeral wheels back to zero. At this time, the fingers 32 enter the notches 31 and the movement of said fingers is utilized in a manner forming no part of the present invention, to perform desired work, for instance, cause closing of a liquid shut-off valve associated with a meter driving the counter.

In Figs. 1 and 2 the setting shaft 23 is provided with spaced circumferential grooves 33 for cooperation with an enclosed spring-pressed ball or detent 34 to hold said shaft in any of the positions in which it must be rotated to set the numeral wheels. In Fig. 8, the hub 35a of the knob 28 is elongated and provided with grooves 33a for co-action with a spring finger or detent 34a for the same purpose. Either of these structures or other appropriate means may be used and a suitable stop such as 23a may be employed to limit the outward sliding of the shaft 23.

Each of the numeral wheels may be of the specific construction shown, most parts of which can now be purchased upon the market, or may be constructed in any other preferred manner. For the following description of the construction shown, see more particularly Figs. 5 and 6. In these views, 35 denotes a hub to which a disk 36 is secured, said disk carrying the ratchet teeth 20 which project laterally from it. Lying against one side of the disk 36 is a composition disk 37 having an annular flange 38 surrounding the teeth 20 and carrying the numerals. Lying against the disk 37 is a disk 39 having a recess 40 in which the pawl 22 and its spring 41 are located. The body 42 of the two-tooth gear 12 lies against the disk 39 and retains the pawl 22 and spring 41 in the recess 40. The disk 36 abuts the body 42 and rivets 43 secure the parts 36, 37, 39, 42, and 30 together. The gear 11 surrounds one end of the hub 35 and carries the pawls 19 which engage the teeth 20. From the wheel 10c, the gear body 42 may be omitted as it is not necessary on the last wheel of the series.

From the foregoing and the accompanying drawing, it will be seen that novel and advantageous provision has been made for attaining the desired end. While the features of construction disclosed may be followed if desired, variations may of course be made within the scope of the invention as claimed.

We claim:

1. In a mechanism of the class described having numeral wheels which may be individually rotated when setting them, said wheels having individual setting members; a rotatable and slidable setting shaft upon which said wheels are mounted, said shaft having longitudinally spaced setting elements equal in number to said wheels and engageable with said setting members of said wheels to allow setting of said wheels by rotating said shaft, said setting elements of said shaft being movable successively into cooperative relation with said setting members of said wheels by sliding said shaft step-by-step to different positions, said setting elements of said shaft being so spaced that when said shaft is slid to cooperatively relate the setting element and member for any one wheel, the setting elements and members for the other wheels will not be cooperatively related.

2. In a mechanism in which numeral wheels are geared together and are connected with their gearing by ratchets to allow turning of the wheels with respect to said gearing for setting the wheels, said wheels having individual setting members; a rotatable and slidable setting shaft upon which said wheels are mounted, said shaft having longitudinally spaced setting elements equal in number to said wheels and engageable with said setting members of said wheels to allow setting said wheels by rotating said shaft, said setting elements of said shaft being movable successively into cooperative relation with said setting members of said wheels by sliding said shaft step-by-step to different positions, said setting elements of said shaft being so spaced that when said shaft is slid to cooperatively relate the setting element and member for any one wheel, the setting elements and members for the other wheels will not be cooperatively related.

3. In a mechanism in which numeral wheels are geared together and are connected with their gearing by ratchets to allow turning of the wheels with respect to said gearing for setting the wheels, said wheels having setting pawls; a rotatable and slidable setting shaft upon which said wheels are mounted and setting shoulders spaced apart along said shaft for co-action with said setting pawls to set said wheels, said shoulders being allotted one to each pawl and being so positioned that any shoulder may be operatively related with its respective pawl by sliding said shaft, the positioning of said shoulders being such that when any shoulder is in operative relation with its respective pawl the other shoulders and pawls are inoperatively related, whereby the wheels may be individually set, by rotating said shaft, to indicate any desired number.

4. In a mechanism of the class described having numeral wheels which may be individually rotated when setting them, said wheels having individual setting pawls; a rotatable and slidable setting shaft upon which said wheels are mounted, said shaft having longitudinally spaced setting shoulders equal in number to said wheels and engageable with said setting pawls to allow setting said wheels by rotating said shaft, said setting shoulders being movable successively into cooperative relation with said setting pawls by sliding said shaft step-by-step to different positions, said setting shoulders being so spaced that when said shaft is slid to cooperatively relate any one of said setting shoulders with the proper setting pawl, all of the other setting shoulders will be out of cooperative relation with all of the other setting pawls.

5. In a mechanism in which numeral wheels are geared together and are connected with their gearing by ratchets to allow turning of the wheels with respect to said gearing for setting the wheels, said wheels having setting pawls; a rotatable and slidable setting shaft, and setting shoulders spaced apart along said shaft for coaction with said setting pawls to set said wheels, said shoulders being allotted one to each pawl and being so positioned that any shoulder may be operatively related with its respective pawl by sliding said shaft, the positioning of said shoulders being such that when any shoulder is in operative relation with its respective pawl the other shoulders and pawls are inoperatively related, whereby the wheels may be individually set, by rotating said shaft, to indicate any desired number.

WALTER S. BRUBAKER.
ARMAS J. SAARINEN.